United States Patent
Corson et al.

(10) Patent No.: US 8,693,372 B2
(45) Date of Patent: Apr. 8, 2014

(54) METHODS AND APPARATUS FOR FORMING, MAINTAINING AND/OR USING OVERLAPPING NETWORKS

(75) Inventors: M. Scott Corson, Gillette, NJ (US); Vincent D. Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 12/361,853

(22) Filed: Jan. 29, 2009

(65) Prior Publication Data
US 2010/0189107 A1 Jul. 29, 2010

(51) Int. Cl.
*H04L 12/28* (2006.01)
*H04L 12/56* (2006.01)

(52) U.S. Cl.
CPC .............. *H04L 45/22* (2013.01); *H04L 45/74* (2013.01)
USPC ............................ 370/255; 370/392; 370/338

(58) Field of Classification Search
None
See application file for complete search history.

(56) References Cited

U.S. PATENT DOCUMENTS

| | | | |
|---|---|---|---|
| 5,251,205 A * | 10/1993 | Callon et al. ................. | 370/392 |
| 6,842,462 B1 | 1/2005 | Ramjee et al. | |
| 7,185,106 B1 * | 2/2007 | Moberg et al. ............... | 709/238 |
| 7,684,339 B2 * | 3/2010 | Oguchi et al. ............... | 370/248 |
| 7,853,714 B1 * | 12/2010 | Moberg et al. ............... | 709/238 |
| 7,978,710 B2 * | 7/2011 | Krishnan et al. ........... | 370/395.4 |
| 2002/0004843 A1* | 1/2002 | Andersson et al. .......... | 709/238 |
| 2003/0079144 A1* | 4/2003 | Kakemizu et al. ........... | 713/200 |
| 2004/0071084 A1* | 4/2004 | El-Hennawey et al. ...... | 370/230 |
| 2006/0013171 A1* | 1/2006 | Ahuja et al. ................. | 370/338 |
| 2006/0262786 A1 | 11/2006 | Shimizu et al. | |
| 2006/0291446 A1* | 12/2006 | Caldwell et al. ............. | 370/351 |
| 2007/0086429 A1* | 4/2007 | Lawrence et al. ............ | 370/351 |
| 2007/0174660 A1* | 7/2007 | Peddada .......................... | 714/4 |
| 2008/0247392 A1* | 10/2008 | White et al. .................. | 370/392 |
| 2009/0323589 A1* | 12/2009 | Mahany et al. ............... | 370/328 |
| 2011/0033047 A1* | 2/2011 | Volpano et al. .............. | 380/255 |

FOREIGN PATENT DOCUMENTS

WO WO2008033618 3/2008

OTHER PUBLICATIONS

International Search Report and Written Opinion—PCT/US10/022286, International Search Authority—European Patent Office, May 12, 2010.
Bein, D., et al., "A Self-stabilizing Link-Cluster Algorithm in Mobile Ad Hoc Networks", Parallel Architectures, Algorithms and Networks, 2005, ISPAN 2005, Proceedings 8th International Symposium on IEEE Dec. 9, 2005.

(Continued)

*Primary Examiner* — Ayaz Sheikh
*Assistant Examiner* — Mounir Moutaouakil
(74) *Attorney, Agent, or Firm* — James K. O'Hare

(57) ABSTRACT

Methods and apparatus related to routing in communications networks are described. Various embodiments are well suited to wireless communications systems lacking centralized control, e.g., a mobile wireless communications system supporting the dynamic formation and/or maintenance of overlapping peer-to-peer ad hoc networks. A node can establish multiple links, e.g., with different links corresponding to different overlapping networks. Next hop packet routing information, e.g., forwarding tables, are maintained on a per network basis. A node determines the next hop routing for a received packet to be forwarded based on the link upon which the packet was received, which is associated with a particular network, and the included packet destination address. The same destination address may, and sometimes does, correspond to different next hop nodes for different networks.

15 Claims, 10 Drawing Sheets

(56) References Cited

OTHER PUBLICATIONS

Fujimoto, M., et al., "Adaptability and Stability of Hierarchical Routing in Ad Hoc", IPSJ SIG Mobile Computing and Ubiquitous Communications, The Information Processing Society of Japan, Sep. 25, 2003, 2003(93), pp. 7-14.

Narumi, H., et al., "Proposal, Implementation and Evaluation of Cluster-by-Cluster Routing Algorithm in MANET," IPSJ SIG Mobile Computing and Ubiquitous Communications, the Information Processing Society of Japan, Jan. 22, 2009, 2009(8).

Yu, J.Y., et al., "Performance of Efficient CBRP in Mobile Ad Hoc Networks (MANETS)", Vehicular Technology Conference, 2008, VTC 2008-Fall, IEEE 68th, IEEE, Sep. 21-24, 2008, pp. 1-7.

* cited by examiner

METHODS AND APPARATUS FOR FORMING, MAINTAINING AND/OR USING OVERLAPPING NETWORKS

FIELD

Various embodiments relate to wireless communications, and more particularly, to methods and apparatus related to routing in a communications system including overlapping networks.

BACKGROUND

As communications networks become more common, the number of communications networks continues to increase. While a node may be common to multiple networks, for routing, security and/or other reasons, it may be desirable to route traffic over one network rather than another. Accordingly, in cases where a node corresponds to two different networks, for a given destination address it may be desirable for the node common to the two networks to route a particular packet over a particular one of a plurality of different paths, where the different paths may correspond to different networks. Thus, while it may be desirable for an individual node to be able to belong to multiple different networks concurrently, this complicates the routing of packets, particularly where it may be desirable to control routing of packets to a particular network.

In view of the above discussion, it should be appreciated that there is a need for methods and apparatus supporting packet routing which allow for different packet routes based on network affiliation. For example, it would be desirable if, in at least some embodiments, nodes which are common to overlapping networks could be implemented to perform packet routing in such a manner that, for at least some packets, a packet received from one network will not be routed over a second network, even if the destination node is reachable via the second network via a shorter route than it can be reached via the first network. Thus, it should be appreciated that methods and/or apparatus which can allow nodes belonging to a first network to be able to exchange packets between one another while keeping the routed packets within the first network would be desirable. While not necessary for all embodiments, it would be particularly desirable if at least some embodiments allowed for the dynamic formation and/or maintenance of overlapping networks, e.g., overlapping peer-to-peer ad hock networks.

SUMMARY

Methods and apparatus related to packet routing in a communications system are described. Various embodiments are well suited to wireless communications systems lacking centralized control, e.g., a mobile wireless communications system supporting the dynamic formation and/or maintenance of overlapping peer-to-peer ad hoc networks.

In some embodiments, a first node receives information from a second node, e.g., peer discovery information of interest, and establishes a link based on the received information. The established link is associated with a network identifier. The first node updates a set of routing information to include one or more forwarding table entries corresponding to the newly established link. The first node may, and sometimes does, establish links corresponding to different networks, e.g. a first link corresponding to network A associated with a first network identifier and a second link corresponding to network B associated with a second network identifier.

Thus, in some but not necessarily all embodiments, one or more nodes correspond to multiple networks at a given time with the routing of packets depending on the network to which a link on which the packet is received belongs in combination with the destination address of the received packet. Packets received at a node on a link corresponding to a first network are routed using links and routing information, e.g., a routing table entry, corresponding to the first network. Similarly, in at least some embodiments, packets received on a link corresponding to a second network are routed using a link and routing information corresponding to the second network. At a node common to multiple networks, e.g., first and second networks, routing tables and/or routing table entries corresponding to the first and second networks may be created and/or updated dynamically, e.g., in response to peer discovery signals and/or other network establishing and/or routing information signals. The described methods and apparatus are particularly well suited for use in ad hoc networks, where links corresponding to different networks may be created on an ad hoc basis, e.g., in response to peer discovery signals, with the created link corresponding to the network with which a received discovery signal, link establishment signal or other signal is received. Nodes common to multiple networks may establish multiple links between themselves, e.g., with different links corresponding to different networks.

By associating a link with a network and establishing multiple links between nodes corresponding to multiple networks, it is possible in accordance with at least some embodiments to perform routing based on the network corresponding to a link on which a packet is received without the packet having to include, e.g., in a header, network association information. Thus, by using a link/network association, packet routing by a node corresponding to multiple links can be controlled so that a received packet will be routed to a node corresponding to the same network as the link on which the packet was received.

In some embodiments, the first node creates and maintains different sets of next hop routing information corresponding to different network identifiers. One exemplary routing table entry relates a destination address in the network with a next hop node in the network for forwarding packets associated with the network. A destination node may belong to two networks, and the same destination address may be associated with two next hop routing entries, a first entry corresponding to the first network and a second entry corresponding to the second network. The node designated as the next hop by the first entry may be, and sometimes is, different than the node designated as the next hop by the second entry. The first node determines the next hop routing for a received packet to be forwarded based on the link upon which the packet was received, which is associated with a particular network, and the included packet destination address.

An exemplary method of operating a first node, in accordance with some embodiments, comprises: receiving information from a second node, said information indicating a first network affiliation for a first link; and updating a set of routing information to include a first forwarding table entry corresponding to the first link, said first forwarding table entry being associated with a first network identifier corresponding to said first indicated network affiliation. An exemplary first node in accordance with some embodiments includes at least one processor configured to: receive information from a second node, said information indicating a first network affiliation for a first link; and update a set of routing information to include a first forwarding table entry corresponding to the first link, said first forwarding table entry being associated with a first network identifier corresponding to said first indicated network affiliation. The exemplary first node further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
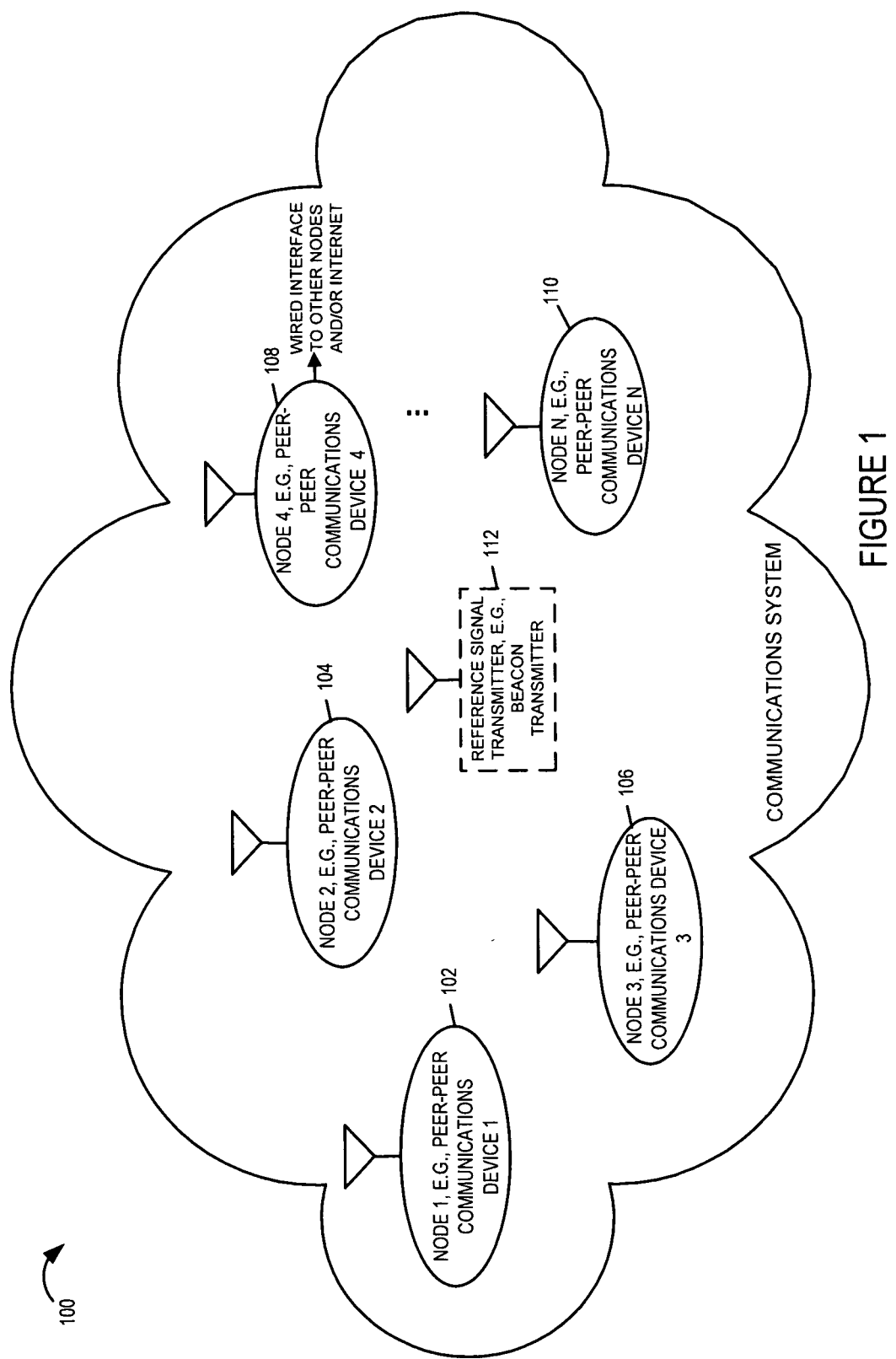
FIG. 1 is a drawing of an exemplary communications system in accordance with an exemplary embodiment.

FIG. 1 is a drawing of an exemplary communications system 100, e.g., a wireless communications system supporting multiple ad hoc peer-to-peer communications networks, in accordance with an exemplary embodiment. The exemplary communications system 100 supports signaling between communication devices, e.g., mobile and/or stationary wireless communications devices, in the same network. At least some communications devices in system 100 may, and sometimes do, belong to a plurality of different networks at the same time.

Exemplary communications system 100 includes a plurality of nodes, e.g. communications devices, supporting peer-to-peer signaling (node 1 102, node 2 104, node 3 106, node 4 108, . . . , node N 110). In some embodiments, the system 100 also includes a reference signal transmitter 112, e.g., a beacon transmitter. Nodes, e.g., wireless peer-to-peer communications devices, in the system 100 which belong to the same network can establish connections with one another, e.g., peer-to-peer connections, and communicate with one another. In some embodiments, there is a recurring timing structure used in the system 100. In some such embodiments a reference signal, e.g., an OFDM beacon signal from reference signal transmitter 112, is used by a node to synchronize with respect to the timing structure. Alternatively, a signal used to synchronize with the timing structure may be sourced from another device, e.g., a GPS transmitter, a base station or another peer-to-peer device.

Exemplary system 100 supports the dynamic establishment of links and the generation/updating of routing information, e.g., routing tables. In some embodiments, received information from peer discovery broadcast signals is used in making link establishment decisions, associating network identifiers with said links, and/or in generating forwarding table entries. Packet forwarding decisions at nodes are based on a network identifier associated with the link over which a packet was received and a packet destination address. At an intermediary node belonging to multiple networks, packets, having the same final destination, which have been received via different links having different associated network identifiers, may be, and sometimes are, forwarded to different next hop nodes, e.g., based on different routing table entries associated with the different networks.

Figure 2:
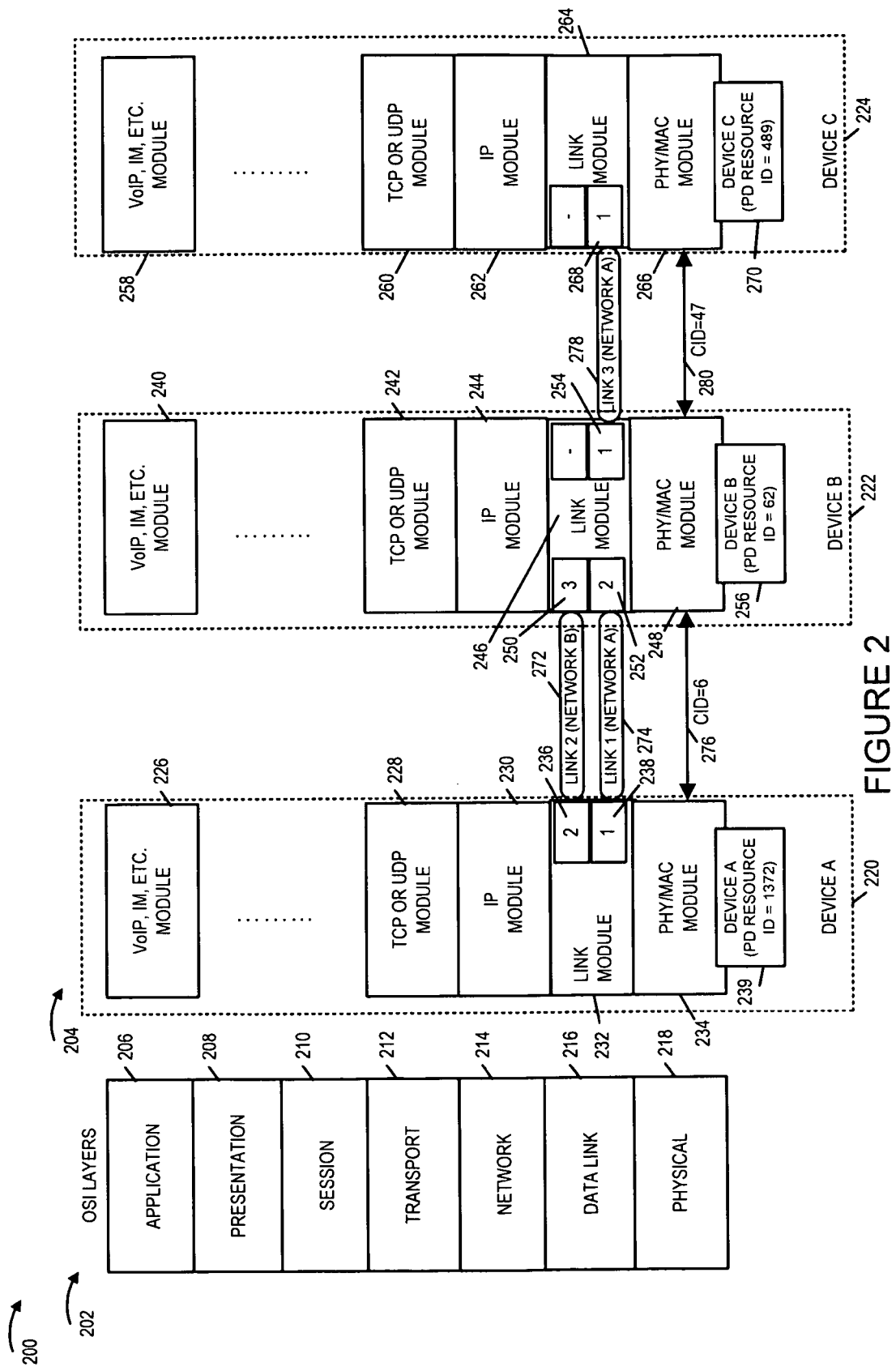
FIG. 2 illustrates exemplary layers used in an exemplary communications system, exemplary nodes, and exemplary network affiliated links in accordance with an exemplary embodiment.

FIG. 2 includes a drawing 200 illustrating exemplary OSI Layers 202 in an exemplary embodiment and a drawing 204 illustrating exemplary devices, e.g., nodes, in accordance with an exemplary embodiment. OSI Layers 202 includes an application layer 206, a presentation layer 208, a session layer 210, a transport layer 212, a network layer 214, a data link layer 216 and a physical layer 218.

The exemplary devices, e.g., nodes supporting peer-to-peer wireless communications, include device A 220, device B 222 and device C 224. Devices (220, 222, 224) are, e.g., nodes of system 100 of FIG. 1. Device A 220 includes a module 226 supporting Voice over Internet Protocol (VoIP) and Instant Messaging, a TCP or UDP module 228, an IP module 230, a Link module 232, and a PHY/MAC module 234. Link module 232 includes network interface module 1 238 and network interface module 2 236. PHY/MAC module 234 includes exemplary Peer Discovery resource ID=1372 239.

Device B 222 includes a module 240 supporting Voice over Internet Protocol (VoIP) and Instant Messaging, a TCP or UDP module 242, an IP module 244, a Link module 246, and a PHY/MAC module 248. Link module 246 includes network interface module 1 254, network interface module 2 252 and network interface module 3 250. PHY/MAC module 248 includes exemplary Peer Discovery resource ID=62 256.

Device C 224 includes a module 258 supporting Voice over Internet Protocol (VoIP) and Instant Messaging, a TCP or UDP module 260, an IP module 262, a Link module 264, and a PHY/MAC module 266. Link module 264 includes network interface module 1 268. PHY/MAC module 266 includes exemplary Peer Discovery resource ID=489 270.

In this example, device A 220 and device B 222 have acquired and are using connection identifier (CID)=6 as indicated by arrow 276 for a peer-to-peer connection on the PHY/MAC physical layer. Device B 222 and device C 224 have acquired and are using connection identifier (CID)=47 as indicated by arrow 280 for a peer-to-peer connection on the PHY/MAC physical layer.

Device A 220 and device B 222 belong to both network A and network B, while device C 224 belongs to network A. Link 1 274 is a link layer connection between network interface 1 238 of link module 232 of device A 220 and network interface 2 252 of link module 246 of device B 222. Link 2 272 is a link layer connection between network interface 2 236 of link module 232 of device A 220 and network interface 3 250 of link module 246 of device B 222. Link 3 278 is a link layer connection between network interface 1 254 of link module 246 of device B 222 and network interface 1 268 of link module 264 of device C 224. Link 1 274, link 3 278 and network interfaces (238, 252, 254 and 268) are associated with network A. Link 2 272 and network interfaces (236, 250) are associated with network B. Each of the devices (220, 222, 224) may include additional network interfaces which may be associated with other connections, e.g., additional link layer connections that may be established. In some embodiments, multiple links associated with the same network are associated with a common network interface corresponding to the network within the device. For example, network interface 2 252 and network interface 1 254 of link module 246 of device B 222, can be combined into a single common network interface associated with network A, where both link 1 274 and link 3 278 connect to the single common network interface.

As illustrated in FIG. 2, a device may establish and maintain multiple independent links with the same device and/or a plurality of other devices. The links are such that packets received via a particular link are distinguishable from packets received via another link.

In accordance with a feature of some embodiments, when a link is established it can be correlated to corresponding discovery information and/or additional similar information exchanged upon link establishment. Thus, a link may be determined to have a particular affiliation, e.g., to be a link affiliated with a particular administrative domain or a link with a device affiliated with a particular administrative domain. Based on this affiliation, a device can instantiate specific configuration, enforce specific policies, and/or execute specific procedures. For example, the corresponding link can be associated with one of a plurality of network interfaces and/or routing tables based on an administrative affiliation determined from the discovery mechanism. This further enables a device to make policy based routing decisions as illustrated in FIG. 3.

Figure 3:
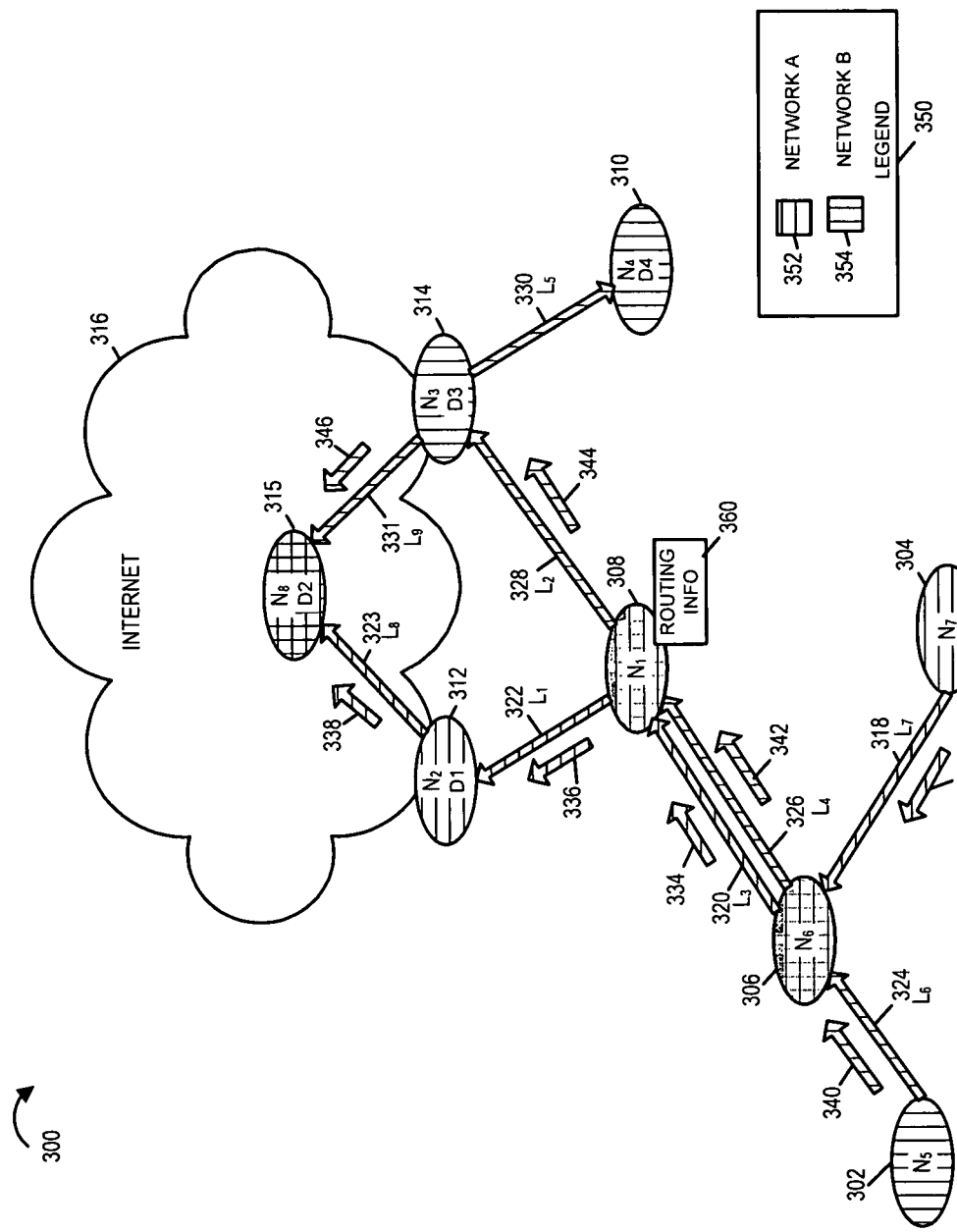
FIG. 3 is a drawing used to illustrate exemplary policy based routing between a set of wireless devices forming multiple overlapping ad hoc networks in accordance with one embodiment.

FIG. 3 is a drawing 300 used to illustrate exemplary policy based routing between a set of wireless devices forming multiple overlapping ad hoc networks in accordance with one embodiment. As shown in FIG. 3, the set of devices ($N_7$ 304, $N_6$ 306, $N_1$ 308, $N_2$ 312, $N_8$ 315) form multi-hop ad hoc routing network A, while the set of devices ($N_5$ 302, $N_6$ 306, $N_1$ 308, $N_3$ 314, $N_4$ 310, $N_8$ 315) form multi-hop ad hoc routing network B. Legend 350 indicates that inclusion in network A is indicated by horizontal line shading as with sample block 352, while inclusion in network B is indicated by vertical line shading as with sample block 354. Note that three devices (node $N_6$ 306, node $N_1$ 308 and node $N_8$ 315), which have both horizontal and vertical line shading, are part of both network A and network B. Links ($L_7$ 318, $L_3$ 320, $L_1$ 322, $L_8$ 323) are part of network A, as indicated by horizontal line shading. Links ($L_6$ 324, $L_4$ 326, $L_2$ 328, $L_5$ 330, $L_9$ 331) are part of network B, as indicated by vertical line shading. Packets (332, 334, 336, 338) shown with horizontal line shading are affiliated with network A and should be forwarded among the network A devices, while packets (340, 342, 344, 346) shown with vertical line shading are affiliated with network B and should be forwarded among the network B devices.

However, note that it is possible for both network A and network B to transport packets with the same destination address. In some cases a device, e.g., a device belonging to both network A and network B, cannot make a simple destination based forwarding decision. In accordance with a feature of some embodiments, packets forwarded between two devices belonging to both network A and network B are sent over one of two links, each of which is affiliated with one of network A or network B multihop ad hoc routing networks. Thus a packet received over one of these links is associated with a corresponding interface and/or routing table to make an appropriate forwarding decision.

Figure 4:
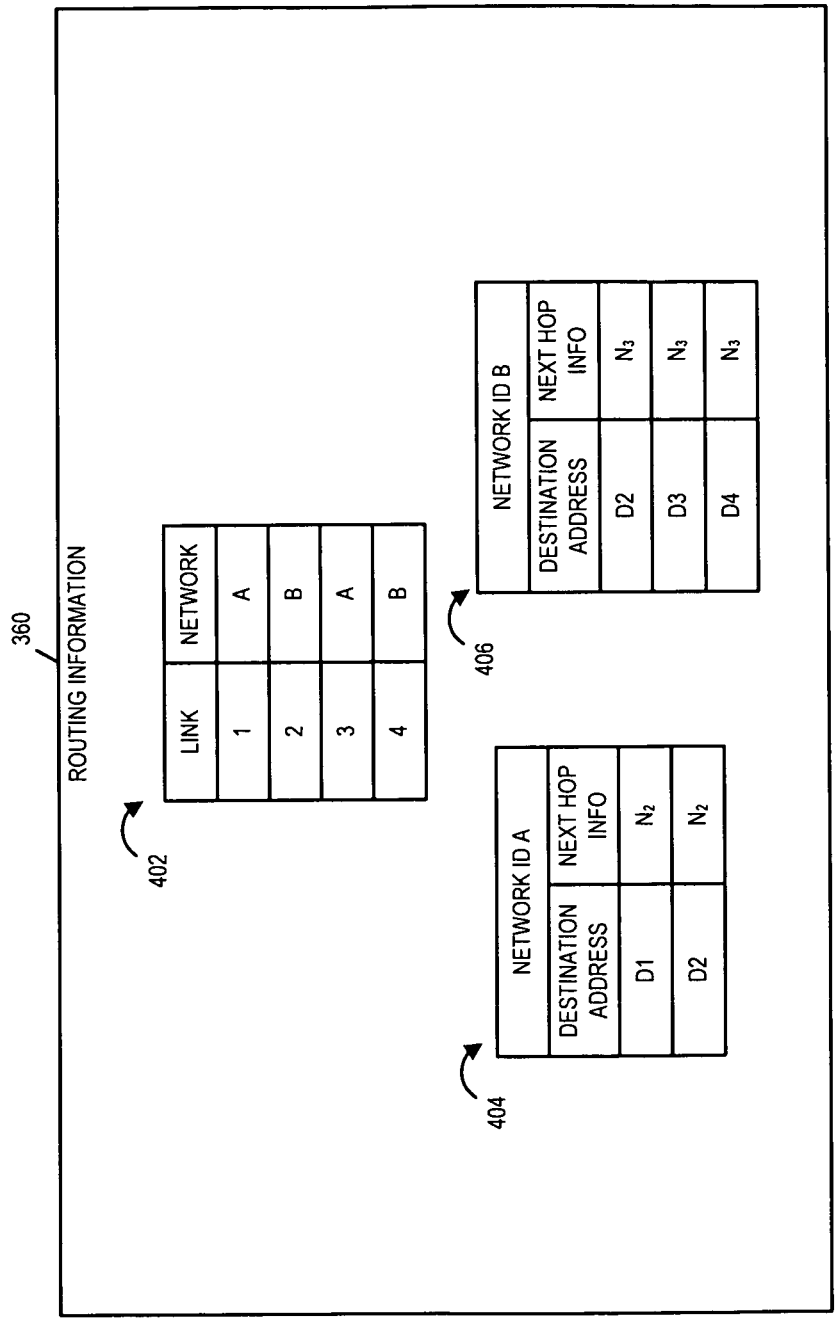
FIG. 4 illustrates exemplary routing information included in a node of FIG. 3 which belongs to a plurality of networks.

Node $N_1$ 308, which belongs to both network A and network B includes routing information 360. FIG. 4 illustrates exemplary routing information 360 included in node $N_1$ 308 of FIG. 3. Routing information 360 includes a link/network routing table 402 which associates each of the links associated with node $N_1$ 308, with one of the networks to which node $N_1$ 308 belongs. Link 1 ($L_1$) 322 is associated with network A; link 2 ($L_2$) 328 is associated with network B; link 3 ($L_3$) 320 is associated with network A; link 4 ($L_4$) 326 is associated with network B. Routing information 360 also includes a destination address/next hop routing table for network A 404 and a destination address/next hop routing table for network B 406.

Destination address next hop routing table for network A 404 indicates that for network A destination address D1 maps to next hop node $N_2$ 312 and destination address D2 also maps to node $N_2$ 312. Destination address next hop routing table for network B 406 indicates that for network B destination address D2 maps to next hop node $N_3$ 314; destination address D3 also maps to node $N_3$ 314; and destination address D4 also maps to node $N_3$ 314.

In this example, node $N_2$ 312 has destination address D1, node $N_8$ 315 has destination address D2, node $N_3$ 314 has destination address D3 and node $N_4$ 310 has destination address D4. Node $N_8$ 315 is also part of Internet 316.

Consider a first example. Node $N_1$ 308 receives packet 334 on link 3 ($L_3$) 320. Further consider that packet 334 includes destination address D2. Node $N_1$ 308 knows from its link/network routing table 402 that link 3 is associated with network A. Node $N_1$ 308 recovers destination address D2 from the received packet 334. Node $N_1$ 308 consults its destination address/next hop mapping table for network A 404 and determines for destination D2 the next hop is node $N_2$ 312. Therefore Node $N_1$ 308 sends packet 336 over link $L_1$ 322 to next hop node $N_2$ 312. Subsequently node $N_2$ 312 will send packet 338 to node $N_8$ 315.

Consider a second example. Node $N_1$ 308 receives packet 342 on link 4 ($L_4$) 326. Further consider that packet 342 includes destination address D2. Node $N_1$ 308 knows from its link/network routing table 402 that link 4 ($L_4$) 326 is associated with network B. Node $N_1$ 308 recovers destination address D2 from the received packet 342. Node $N_1$ 308 consults its destination address/next hop mapping table for network B 406 and determines for destination D2 the next hop is node $N_3$ 314. Therefore Node $N_1$ 308 sends packet 344 over link $L_2$ 328 to next hop node $N_3$ 314. Subsequently node $N_3$ 314, after consulting its routing information, will send packet 346 to node $N_8$ 315.

In the example of FIG. 3, links are shown as being uni-direction. In some embodiments with uni-directional links, links are established in pairs one for each direction, e.g., with corresponding routing table entries. In some embodiments, links are bi-directional and the additional routing table entries are included to cover the various options.

Figure 5:
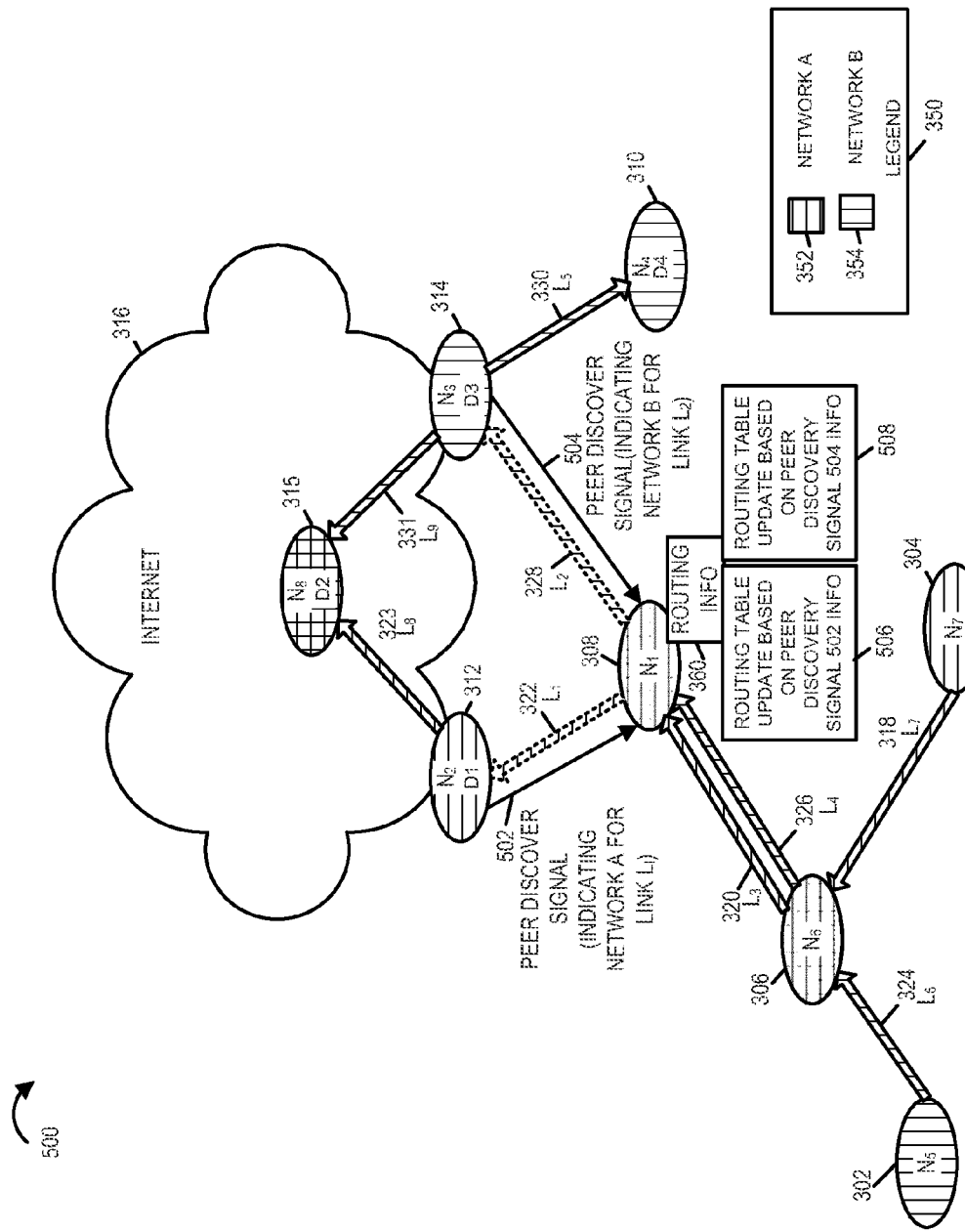
FIG. 5 is a drawing illustrating exemplary network formation including routing information updates based on received peer discovery information.

FIG. 5 is a drawing 500 illustrating exemplary network formation including routing information updates based on received peer discovery information. FIG. 5 may represent the system of FIG. 3 at a time prior to the establishment of link $L_1$ 322 and link $L_2$ 328 at a first node, Node $N_1$ 308.

A second node, Node $N_2$ 312 transmits, e.g., broadcasts, a peer discovery signal or signals 502 communicating information indicating that the network affiliation is network A for link $L_1$ 322. Note that the network affiliation indicated by a peer discovery signal or signals 502 may be either explicit or implicit. Link $L_1$ 322 is the link node $N_2$ 312 would like to establish between node $N_1$ 308 and Node $N_2$ 312. Node $N_1$ 308 receives the peer discovery signal 502 from node $N_2$ 312 communicating information indicating that the network affiliation is network A for link $L_1$ 322. Node $N_1$ 308 makes a decision whether or not to establish link $L_1$ 322 based on the received information. For the purposes of this example, consider that node $N_1$ 308 decides to establish link $L_1$ 322. Node $N_1$ 308 updates a set of routing information to include a first forwarding table entry corresponding to link $L_1$, said first forwarding table entry being associated with a first network identifier corresponding to the indicated network affiliation for link $L_1$ 322, which in this case is network A. Block 506 indicates that a routing table update based on peer discovery signal 502 is performed. The update performed is, e.g., the inclusion of entry {link 1-network A} in link/network table 402, and the inclusion of the entry {D1-$N_2$} in the network ID A destination address/next hop information table 404.

In some embodiments, the received peer discovery information from signal or signals 502 may also convey information about nodes which are members of network A which can be accessed via node $N_2$ 312. For example, the peer discovery information of signal 502 may also convey that node $N_8$ 315, which has destination address D2 is a member of network A and is reachable via node $N_2$ 312. In such an embodiment, the routing table update may also include the inclusion of entry {D2-$N_2$} in destination address/next hop node table 404 for network A. In some embodiments multiple signals 502 are sent from node $N_2$ 312 to node $N_1$ 308, e.g., peer discovery signal(s) prior to link establishment and routing information signal(s) subsequent to link establishment.

A third node, Node $N_3$ 314 transmits, e.g., broadcasts, a peer discovery signal or signals 504 communicating information indicating that the network affiliation is network B for link $L_2$ 328. Note that the network affiliation indicated by a peer discovery signal or signals 504 may be either explicit or implicit. Link $L_2$ 328 is the link that node $N_3$ 314 would like to establish between node $N_1$ 308 and Node $N_3$ 314. Node $N_1$ 308 receives the peer discovery signal 504 from node $N_3$ 314 communicating information indicating that the network affiliation is network B for link $L_2$ 328. Node $N_1$ 308 makes a decision whether or not to establish link $L_2$ 328 based on the received information. For the purposes of this example, consider that node $N_1$ 308 decides to establish link $L_2$ 328. Node $N_1$ 308 updates a set of routing information to include a second forwarding table entry corresponding to link $L_2$ 328, said second forwarding table entry being associated with a second network identifier corresponding to the indicated network affiliation for link $L_2$ 328, which in this case is network B. Block 508 indicates that a routing table update based on peer discovery signal 504 is performed. The update performed is, e.g., the inclusion of entry {link 2-network B} in link/network table 402, and the inclusion of the entry {D3-$N_3$} in the network ID B destination address/next hop information table 406.

In some embodiments, the received peer discovery information from signal or signals 504 may also convey information about nodes which are members of network B which can be accessed via node $N_3$ 314. For example, the peer discovery information of signal 504 may also convey that node $N_8$ 315, which has destination address D2 is a member of network B and is reachable via node $N_3$ 314. In addition the peer discovery information of signal 504 may also convey that node $N_4$ 310, which has destination address D4 is a member of network B and is reachable via node $N_3$ 314. In such an embodiment, the routing table update may also include entry {D2-$N_3$} in destination address/next hop node routing table 406 for network B and entry {D4-$N_3$} in destination address/next hop node routing table 406 for network B. In some embodiments multiple signals 504 are sent from node $N_2$ 312 to node $N_1$ 308, e.g., peer discovery signal(s) prior to link establishment and routing information signal(s) subsequent to link establishment.

Figure 6:
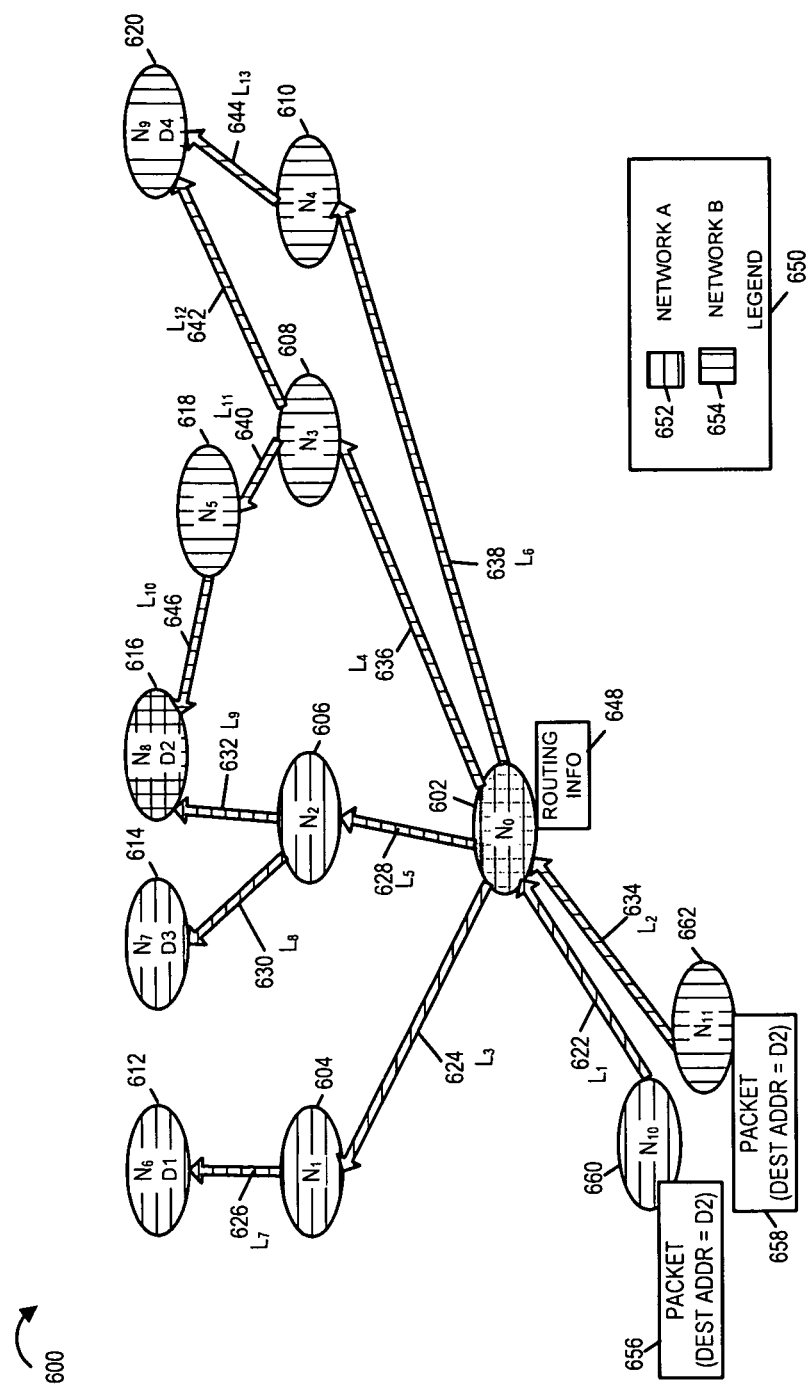
FIG. 6 is a drawing used to illustrate exemplary policy based routing between a set of wireless devices forming multiple overlapping ad hoc networks in accordance with one embodiment.

FIG. 6 is a drawing 600 used to illustrate exemplary policy based routing between a set of wireless devices forming multiple overlapping ad hoc networks in accordance with one embodiment. As shown in FIG. 6, the set of devices ($N_{10}$ 660, $N_0$ 602, $N_1$ 604, $N_6$ 612, $N_2$ 606, $N_7$ 614, $N_8$ 616) form multi-hop ad hoc routing network A, while the set of devices ($N_{11}$ 662, $N_0$ 602, $N_3$ 608, $N_5$ 618, $N_8$ 616, $N_9$ 620, $N_4$ 610) form multi-hop ad hoc routing network B. Legend 650 indicates that inclusion in network A is indicated by horizontal line shading as with sample block 652, while inclusion in network B is indicated by vertical line shading as with sample block 654. Note that two devices (node $N_0$ 602 and node $N_8$ 616), which have both horizontal and vertical line shading, are part of both network A and network B. Links ($L_1$ 622, $L_3$ 624, $L_7$ 626, $L_5$ 628, $L_8$ 630, $L_9$ 632) are part of network A, as indicated by horizontal line shading. Links ($L_2$ 634, $L_4$ 636, $L_6$ 638, $L_{10}$ 646, $L_{11}$ 640, $L_{12}$ 642, $L_{13}$ 644) are part of network B, as indicated by vertical line shading. Packet 656 is affiliated with network A and should be forwarded among the network A devices, while packet 658 is affiliated with network B and should be forwarded among the network B devices.

However, note that it is possible for both network A and network B to transport packets with the same destination address. For example, packet 656 associated with network A has destination address D2, and packet 658 associated with network B also has destination address D2.

Figure 7:
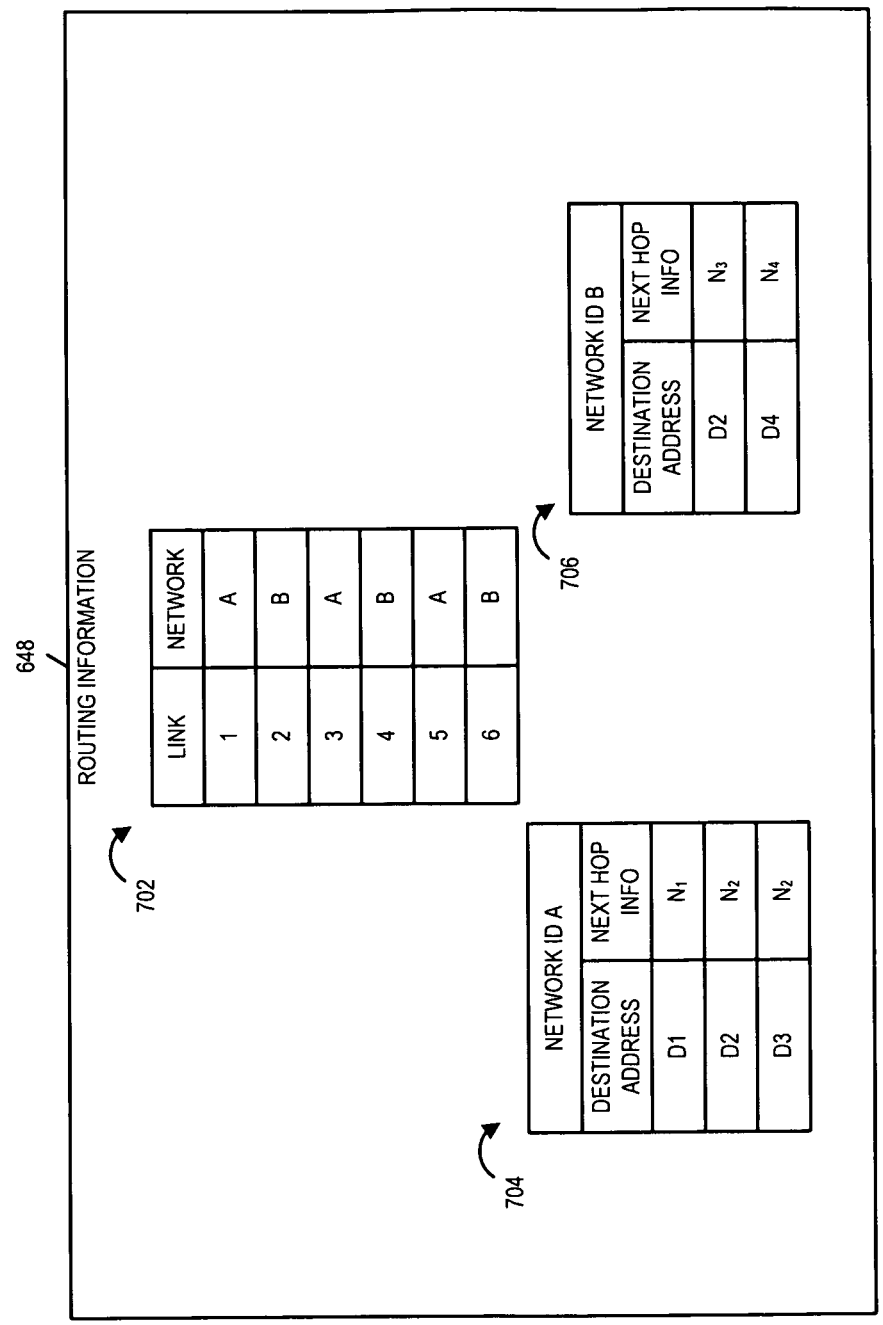
FIG. 7 illustrates exemplary routing information included in a node of FIG. 5 which belongs to a plurality of networks.

Node $N_0$ 602, which belongs to both network A and network B includes routing information 648. In this example, Node $N_6$ 612 has destination address D1, node $N_7$ 614 has destination address D3, node $N_8$ 616 has destination address D2, and node $N_9$ 620 has destination address D4. FIG. 7 illustrates exemplary routing information 648 included in node $N_0$ 602 of FIG. 6. Routing information 648 includes a link/network routing table 702 which associates each of the links associated with node $N_0$ 602, with one of the networks to which node $N_0$ 602 belongs. Link 1 ($L_1$) 622 is associated with network A; link 2 ($L_2$) 634 is associated with network B; link 3 ($L_3$) 624 is associated with network A; link 4 ($L_4$) 636 is associated with network B; link 5 ($L_5$) 628 is associated with network A; and link 6 ($L_6$) 638 is associated with network B. Routing information 648 also includes a destination address/next hop routing table for network A 704 and a destination address/next hop routing table for network B 706.

Destination address next hop routing table for network A 704 indicates that for network A destination address D1 maps to next hop node $N_1$ 604, destination address D2 maps to next hope node $N_2$ 606 and destination address D3 also maps to node $N_2$ 606. Destination address next hop routing table for network B 706 indicates that for network B destination address D2 maps to next hop node $N_3$ 608; and destination address D4 maps to node $N_4$ 610.

In some embodiments, additional destination addresses may be associated with other nodes and additional entries may be included in the destination address/next hop routing tables (704, 706). For example, destination addresses may be associated with nodes $N_1$ 604 and $N_2$ 606 and additional entries may be included in network A destination address/next hop mapping table 704. Similarly, destination addresses may be associated with nodes $N_3$ 608, $N_5$ 618, and $N_4$ 610 and additional entries may be included in network B destination address/next hopping table 706.

Consider a first example. Node $N_0$ 602 receives packet 656 on link 1 ($L_1$) 622 from node $N_{10}$ 660. Packet 656 includes destination address D2. Node $N_0$ 602 knows from its link/network routing table 702 that link 1 is associated with network A. Node $N_0$ 602 recovers destination address D2 from the received packet 656. Node $N_0$ 602 consults its destination address/next hop mapping table for network A 704 and determines for destination D2 the next hop is node $N_2$ 606. Therefore Node $N_0$ 602 sends a packet over link $L_5$ 628 to next hop node $N_2$ 606. Subsequently node $N_2$ 606 will send a packet to node $N_8$ 616 which has the destination address D2. Thus information included in packet 656 is communicated from $N_{10}$ 660 to node $N_8$ 616, which has destination address D2, via network A over the path: link $L_1$ 622, $N_0$ 602, link $L_5$ 628, $N_2$ 606, link $L_9$ 632.

Consider a second example. Node $N_0$ 602 receives packet 658 on link 2 ($L_2$) 634 from node $N_1$ 662. Packet 658 includes destination address D2. Node $N_0$ 602 knows from its link/network routing table 702 that link 2 ($L_2$) 634 is associated with network B. Node $N_0$ 602 recovers destination address D2 from the received packet 658. Node $N_0$ 602 consults its destination address/next hop mapping table for network B 706 and determines for destination D2 the next hop is node $N_3$ 608. Therefore node $N_0$ 602 sends a packet over link $L_4$ 636 to next hop node $N_3$ 608. Subsequently node $N_3$ 608, after consulting its routing table, will send a packet to node $N_5$ 618. Subsequently node $N_5$ 618 will send a packet to node $N_8$ 616 which has the destination address D2. Thus information included in packet 658 is communicated from $N_{11}$ 662 to node $N_8$ 616, which has destination address D2, via network B over the path: link $L_2$ 634, $N_0$ 602, link $L_4$ 636, $N_3$ 608, link $L_{11}$ 640, $N_5$ 618, $L_{10}$ 646.

It should be appreciated that packets received at node $N_0$ 602 with the same destination address (D2) are communicated to the destination along different routes. The routing determination at node $N_0$ 602 is based on the network on which the packet was received and the destination address. Node $N_0$ 602 selects and uses a destination address/next hop routing table as a function of the network ID corresponding to the received packet. In some embodiments, the different links which are associated with different networks on which packets are received by node $N_0$ 602 are associated with different corresponding interfaces.

Figure 8:
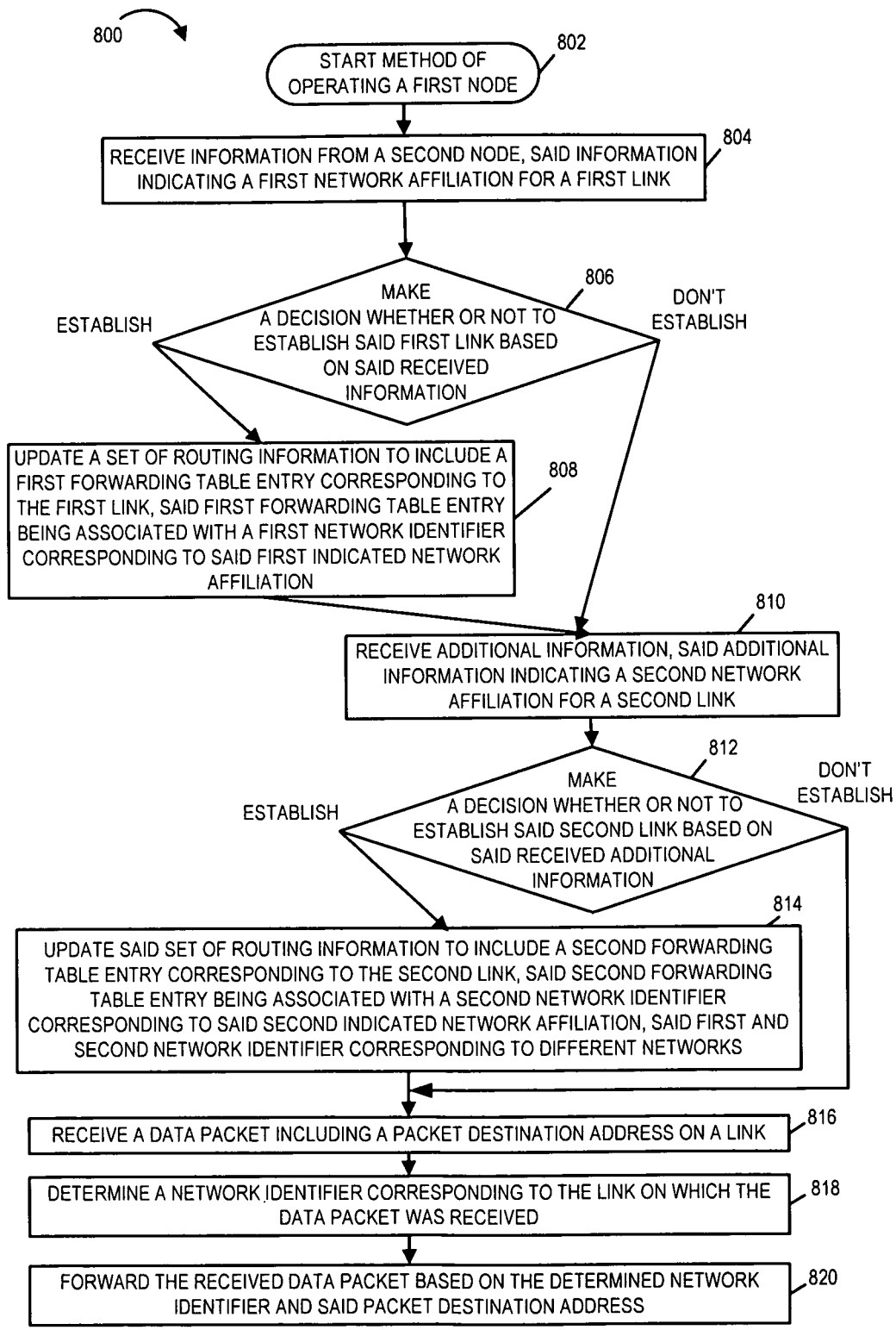
FIG. 8 is a flowchart of an exemplary method of operating a first node in accordance with an exemplary embodiment.

FIG. 8 is a flowchart 800 of an exemplary method of operating a first node in accordance with an exemplary embodiment. While in the exemplary embodiment link establishment is associated with routing state update operations, it should be appreciated that in some embodiments routing state can, and is, created for a link which has not yet been and may not be established. In some such embodiments the link can and is established, as needed, e.g., sometime after the state corresponding to the link has been entered into one or more state tables or other storage devices including link state information. In some such embodiments, information is included with link state information for a link which indicates if the link for which information is provided has not yet been established. If a link for which state information is stored has not yet been established but is to be used to route data or other information, the system will establish the particular link as needed. Operation starts in step 802, where the first node is powered on and initialized and proceeds to step 804.

In step 804, the first node receives information from a second node, said information indicating a first network affiliation for a first link. In some embodiments, the received information is peer discovery information. In some embodiments, the received information explicitly indicates said first network affiliation. For example, the received information, e.g., the received peer discovery information includes information which directly identifies or specifies the first network affiliation. In some embodiments, the received information implicitly indicates said first network affiliation. For example, the received information, e.g., received discovery information, could indicate that the second node is being used by user A, and that user A is running a particular application. This may imply a network affiliation to the first network because, for example, user A, the particular application, and/or the combination of user A and the particular application may be known to be affiliated with the first network. Operation proceeds from step 804 to step 806. In step 806 the first node makes a decision whether or not to establish the first link based on said received information. For example, the received information may indicate that the first network affiliation is with a first network of which the first and second nodes are affiliated, but without the establishment of the first link the first node is unable to send first network packets to the second node, and in such a situation the first node may decide to establish the first link. As another scenario consider that the received information may indicate that the first network affiliation is with a first network of which the first and second nodes are affiliated but that there is already an established first network routing path via which the first node can indirectly send first network packets to the second node, and in such a situation the first node may decide not to establish the first link. If the decision of step 806 is to establish said first link, then operation proceeds from step 806 to step 808; however, if the decision of step 806 is not to establish the first link then operation proceeds from step 806 to step 810.

Returning to step 808, in step 808 the first node updates a set of routing information to include a first forwarding table entry corresponding to the first link, said first forwarding table entry being associated with a first network identifier corresponding to said first indicated network affiliation. Operation proceeds from step 808 to step 810.

In step 810 the first node receives additional information, said additional information indicating a second network affiliation for a second link. The received additional information may indicate the second network affiliation either explicitly or implicitly. Operation proceeds from step 810 to step 812. In step 812 the first node makes a decision whether or not to establish the second link based on said received additional information. If the decision of step 812 is to establish said second link, then operation proceeds from step 812 to step 814; however, if the decision of step 814 is not to establish the second link then operation proceeds from step 812 to step 816.

Returning to step 814, in step 814 the first node updates said set of routing information to include a second forwarding table entry corresponding to the second link, said second forwarding table entry being associated with a second network identifier corresponding to said second indicated network affiliation, said first and second network identifier corresponding to different networks. In some embodiments, the first and second forwarding table entries indicate different next hop forwarding information for a packet destination address. In some such embodiments, the first and second forwarding table entries were generated from information received from different nodes or learned over different links. Operation proceeds from step 814 to step 816.

In step 816 the first node receives a data packet including a packet destination address on a link. Operation proceeds from step 816 to step 818. In step 818 the first node determines a network identifier corresponding to the link on which the data packet was received. Then, in step 820 the first node forwards the received data packet based on the determined network identifier and said packet destination address. In some embodiments, the set of routing information includes at least two entries corresponding to the packet destination address, and each entry of said at least two entries is associated with a different network identifier.

Figure 9:
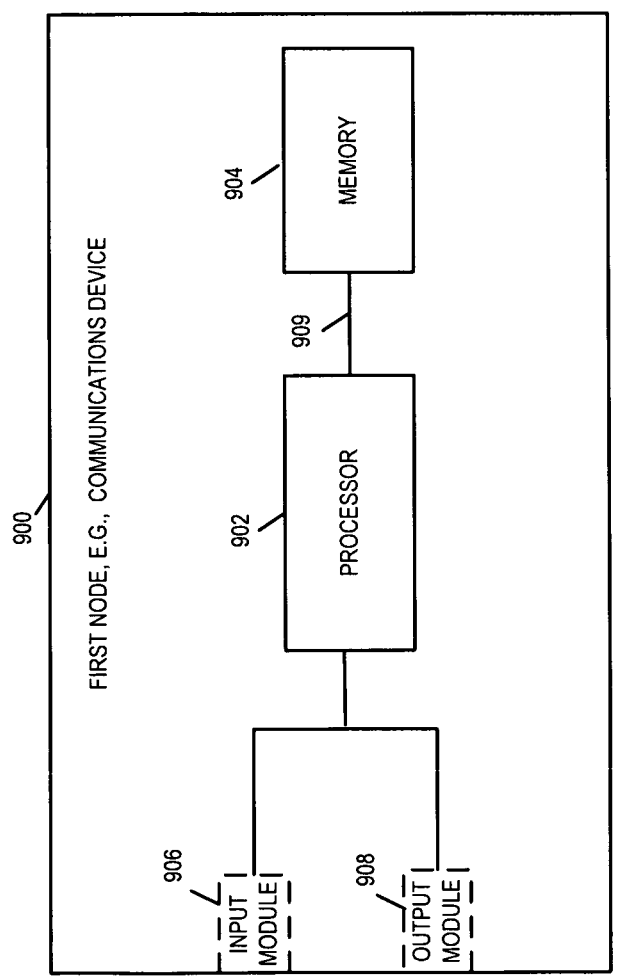
FIG. 9 is a drawing of an exemplary first node in accordance with an exemplary embodiment.

FIG. 9 is a drawing of an exemplary first node 900, e.g., a wireless communications device, in accordance with an exemplary embodiment. Exemplary first node 900 may be one of the exemplary nodes of system 100 of FIG. 1, one of the exemplary devices of FIG. 2 and/or one of the exemplary nodes of any of FIG. 3, 5, or 7. Exemplary first node 900 implements a method in accordance with flowchart 800 of FIG. 8.

First node 900 includes a processor 902 and memory 904 coupled together via a bus 909 over which the various elements (902, 904) may interchange data and information. First node 900 further includes an input module 906 and an output module 908 which may be coupled to processor 902 as shown. However, in some embodiments, the input module 906 and output module 908 are located internal to the processor 902. Input module 906 can receive input signals. Input module 906 can, and in some embodiments does, include a wireless receiver and/or a wired or optical input interface for receiving input. Output module 908 may include, and in some embodiments does include, a wireless transmitter and/or a wired or optical output interface for transmitting output.

Processor 902 is configured to: receive information from a second node, said information indicating a first network affiliation for a first link; and update a set of routing information to include a first forwarding table entry corresponding to the first link, said first forwarding table entry being associated with a first network identifier corresponding to said first indicated network affiliation. In some embodiments, the received information from the second node is peer discovery information. The received information indicating a first network affiliation for a first link may indicate the first network affiliation either explicitly or implicitly. Processor 902 is further configured to make a decision whether or not to establish said first link based on said received information. In some embodiments, processor is further configured to: receive additional information, said additional information indicating a second network affiliation for a second link; and update said set of routing information to include a second forwarding table entry corresponding to the second link, said second forwarding table entry being associated with a second network identifier corresponding to said second indicated network affiliation, said first and second network identifiers corresponding to different networks. In some embodiments, the received additional information is peer discovery information. The received additional information indicating a second network affiliation for a second link may indicate the second network affiliation either explicitly or implicitly.

Processor 902 is also configured to: receive a data packet including a packet destination address on a link; determine a network identifier corresponding to the link on which the data packet was received; and forward the received data packet based on the determined network identifier and said packet destination address.

The set of routing information may, and sometimes does, includes at least two entries corresponding to said packet destination address, each entry of said at least two entries being associated with a different network identifier. In some embodiments, said first and second forwarding table entries indicate different next hop forwarding information for said packet destination address. The first and second forwarding table entries, in some such embodiments, were generated from information received from different nodes or learned over different links.

Figure 10:
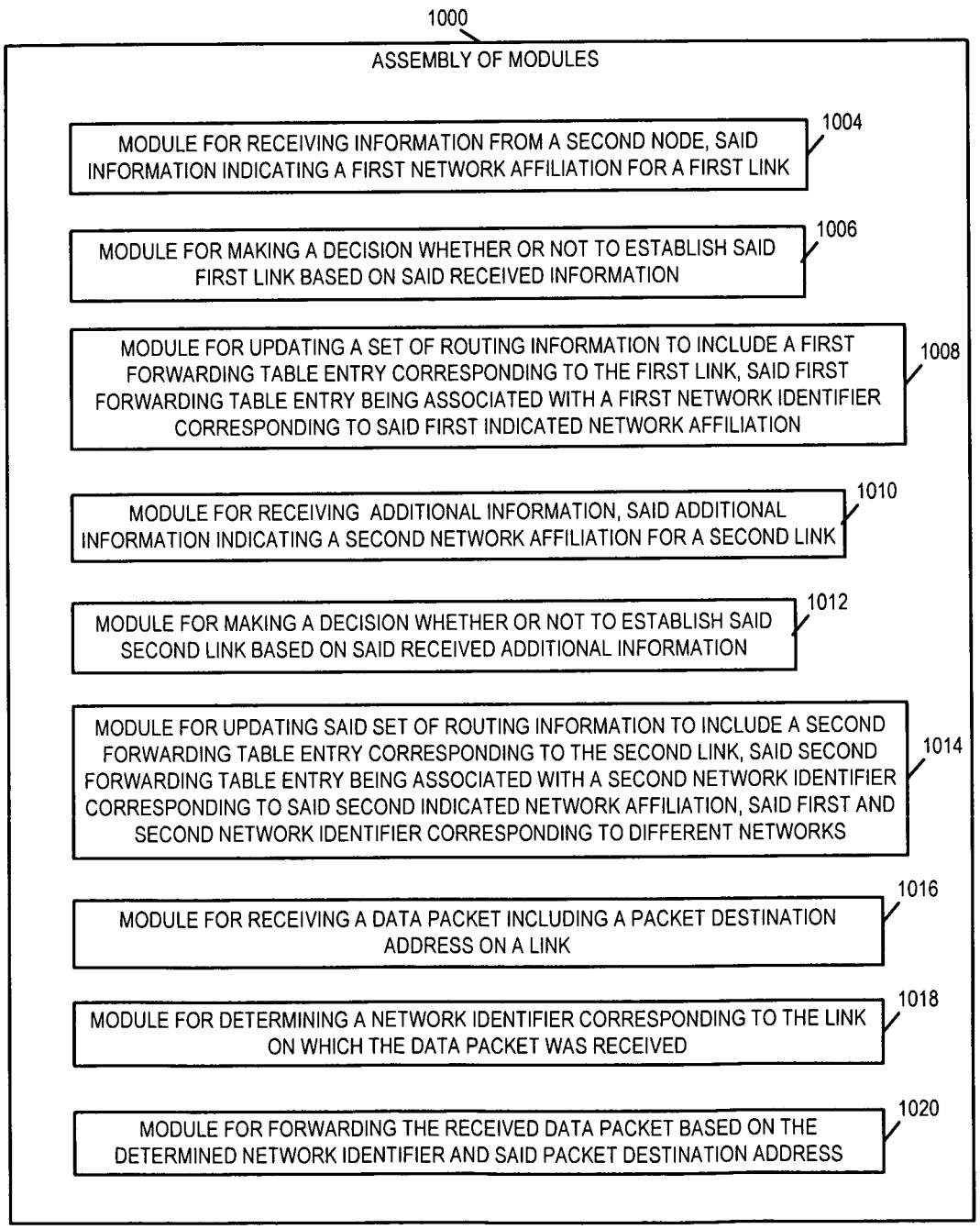
FIG. 10 is an assembly of modules which can, and in some embodiments are, used in the communications device illustrated in FIG. 9.

FIG. 10 is an assembly of modules 1000 which can, and in some embodiments are, used in the first node 900 illustrated in FIG. 9. The modules in the assembly 1000 can be implemented in hardware within the processor 902 of FIG. 9, e.g., as individual circuits. Alternatively, the modules may be implemented in software and stored in the memory 904 of the first node 900 shown in FIG. 9. While shown in the FIG. 9 embodiment as a single processor, e.g., computer, it should be appreciated that the processor 902 may be implemented as one or more processors, e.g., computers. When implemented in software the modules include code, which when executed by the processor, configure the processor, e.g., computer, 902 to implement the function corresponding to the module. In embodiments where the assembly of modules 1000 is stored in the memory 904, the memory 904 is a computer program product comprising a computer readable medium comprising code, e.g., individual code for each module, for causing at least one computer, e.g., processor 902, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 10 control and/or configure the first node 900 or elements therein such as the processor 902, to perform the functions of the corresponding steps illustrated in the method flowchart 800 of FIG. 8.

As illustrated in FIG. 10, the assembly of modules 1000 includes: a module 1004 for receiving information from a second node, said information indicating a first network affiliation for a first link, a module 1006 for making a decision whether or not to establish said first link base on said received information, a module 1008 for updating a set of routing information to include a first forwarding table entry corresponding to the first link, said first forwarding table entry being associated with a first network identifier corresponding to said first indicated network affiliation. In some embodiments, the received information is peer discovery information.

Assembly of modules 1000 further includes a module 1010 for receiving additional information indicating a second network affiliation for a second link, a module 1012 for making a decision whether or not to establish said second link based on said received additional information, and a module 1014 for updating said set of routing information to include a second forwarding table entry corresponding to the second link, said second forwarding table entry being associated with a second network identifier corresponding to said second indicated network affiliation, said first and second network identifiers corresponding to different networks. In some embodiments, both the received information and the received addition information are peer discovery information. The received information indicating a first network affiliation for a first link, as received by module 1004 may indicate the first network affiliation either explicitly or implicitly. The received additional information indicating a second network affiliation for a second link, as received by module 1010 may indicate the second network affiliation either explicitly or implicitly. In some embodiments, the first and second forwarding table entries indicate different next hop forwarding information for a packet destination address. In some such embodiments, the first and second forwarding table entries were generated from information received from different nodes or learned over different links.

Assembly of modules 1000 further includes a module 1016 for receiving a data packet including a packet destination address on a link, a module 1018 for determining a network identifier corresponding to the link on which the data packet was received, and a module 1020 for forwarding the received data packet based on the determined network identifier and said packet destination address. In some embodiments, the set of routing information includes at least two entries corresponding to said packet destination address, each entry of said at least two entries being associated with a different network identifier.

Various embodiments are well suited to mobile wireless communications systems that enable direct communications between a set of devices, e.g., an ad hoc peer-to-peer network. In some embodiments, a set of devices interconnected by a set of direct communications connections, e.g., peer-to-peer connections, can, and sometimes do, form a multi-hop network. Devices in the network may forward traffic sourced and/or destined to other devices in the network. Within a communications system a plurality of networks may be formed and at least some devices may be affiliated with multiple networks at the same time.

In accordance with a feature of some embodiments, a discovery mechanism enables a device to autonomously detect other devices that are associated by something of interest, e.g., user, application, service or network, to the particular discovering device. In various embodiments, the discovery mechanism is based in part on the sending of discovery information by each device. In some instances, a device sends multiple identifiers or affiliations that can be independently received and/or interpreted by other devices. For example, a device may transmit, e.g., broadcast, a first set of discovery information to make known its affiliation with network A, and the device may also transmit, e.g., broadcast a second set of discovery information to make known its affiliation with network B. Such discovery information, in some embodiments, is recovered by other devices in its vicinity, used in making link establishment decisions, and/or used to generate, update, and/or maintain routing information, e.g., next hop routing information associated with a network. In some embodiments signals, e.g., discovery information signals, are broadcast by a device and it is possible to determine from information communicated by such signals a relationship with a particular network, e.g., by using existing knowledge associating some information communicated by the broadcast signal with a particular network without the need for the network to be expressly identified in the signal. In this manner network affiliations can be implicitly communicated.

Some described embodiments refer to multiple links between two nodes, e.g., a first link associated with network A and a second link associated with network B. In some embodiments, an approach is used where there is a single link between two nodes; however, there are multiple sub-links between the two nodes, e.g., one sub-link associated with network A and one sub-link associated with network B. In some embodiments, the multiple sub-links are referred to as virtual pipes. In some embodiments, with multiple sub-links, the single link has a single set of encryption keys used by the multiple sub-links.

The techniques of various embodiments may be implemented using software, hardware and/or a combination of software and hardware. Various embodiments are directed to apparatus, e.g., relay stations, mobile nodes such as mobile access terminals, base stations including one or more attachment points, and/or communications systems. Various embodiments are also directed to methods, e.g., method of controlling and/or operating relay stations, mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, receiving information from a second node, said information indicating a first network affiliation for a first link, updating a set of routing information to include a first forwarding table entry corresponding to the first link, said first forwarding table entry being associated with a first network identifier corresponding to said first indicated network affiliation, etc. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals which may be mobile devices, base stations, and/or relay stations are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems. At least some of the methods and apparatus are applicable to hybrid systems, e.g. a system including OFDM and CDMA signaling techniques.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between mobile nodes, between mobile nodes and relay stations, between access nodes and mobile nodes, between access nodes and relay station, and/or between relay stations and mobile nodes. In some embodiments the access nodes are implemented as base stations which establish communications links with mobile nodes and/or relay stations using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first node, the method comprising:
   receiving information from a second node, said information indicating a first network affiliation of a first ad-hoc wireless network for a first link between the first node and the second node;
   updating a set of routing information to include a first forwarding table entry corresponding to the first link, said first forwarding table entry being associated with a first network identifier corresponding to said first indicated network affiliation;
   receiving additional information from a third node, said additional information indicating a second network affiliation of a second ad-hoc wireless network for a second link between the first node and the third node;
   updating said set of routing information to include a second forwarding table entry corresponding to the second link, said second forwarding table entry being associated with a second network identifier corresponding to said second indicated network affiliation, said first and second network identifiers corresponding to different networks;
   receiving a data packet including a packet destination address on a link, the packet destination address being associated with a destination node, the destination node being capable of being a part of both the first ad-hoc wireless network and a second ad-hoc wireless network;
   determining a network identifier corresponding to the link on which the data packet was received; and
   forwarding the received data packet through one of a plurality of paths to the packet destination address based on at least the packet destination address, the determined network identifier, and a network affiliation included in the set of routing information, wherein the plurality of paths comprises a first path associated with the first ad-hoc wireless network and a second path associated with the second ad-hoc wireless network.

2. The method of claim 1, further comprising:
   making a decision whether or not to establish said first link based on said received information.

3. The method of claim 2, further comprising becoming a member of the first network upon establishing said first link.

4. The method of claim 2, wherein said making the decision comprises:
   determining whether a second data packet can be sent from the first node to the second node without establishing the first link; and
   establishing the first link when the first node is unable to send the second data packet to the second node without establishing the first link.

5. The method of claim 1, wherein said set of routing information includes at least two entries corresponding to said packet destination address, each entry of said at least two entries being associated with a different network identifier.

6. The method of claim 1, wherein the second node and the third node are different nodes.

7. The method of claim 1, wherein the second node and the third node are the same node.

8. The method of claim 1, further comprising receiving information from the second node regarding at least one node in the first network that may be accessed through the second node.

9. A first node comprising:
   at least one processor configured to:
   receive information from a second node, said information indicating a first network affiliation of a first ad-hoc wireless network for a first link between the first node and the second node;
   update a set of routing information to include a first forwarding table entry corresponding to the first link, said first forwarding table entry being associated with a first network identifier corresponding to said first indicated network affiliation;
   receive additional information from a third node, said additional information indicating a second network affiliation of a second ad-hoc wireless network for a second link between the first node and a third node;
   update said set of routing information to include a second forwarding table entry corresponding to the second link, said second forwarding table entry being associated with a second network identifier corresponding to said second indicated network affiliation, said first and second network identifiers corresponding to different networks;
   receive a data packet including a packet destination address on a link, the packet destination address being associated with a destination node, the destination node being capable of being a part of both the first ad-hoc wireless network and a second ad-hoc wireless network;
   determine a network identifier corresponding to the link on which the data packet was received; and
   forward the received data packet through one of a plurality of paths to the packet destination address based on at least the packet destination address, the determined network identifier, and a network affiliation included in the set of routing information, wherein the plurality of paths comprises a first path associated with the first ad-hoc wireless network and a second path associated with the second ad-hoc wireless network;

and memory coupled to said at least one processor.

10. The first node of claim 9, wherein said at least one processor is further configured to:
make a decision whether or not to establish said first link based on said received information.

11. A first node comprising:
means for receiving information from a second node, said information indicating a first network affiliation of a first ad-hoc wireless network for a first link between the first node and the second node;
means for updating a set of routing information to include a first forwarding table entry corresponding to the first link, said first forwarding table entry being associated with a first network identifier corresponding to said first indicated network affiliation;
means for receiving additional information from a third node, said additional information indicating a second network affiliation of a second ad-hoc wireless network for a second link between the first node and the third node;
means for updating said set of routing information to include a second forwarding table entry corresponding to the second link, said second forwarding table entry being associated with a second network identifier corresponding to said second indicated network affiliation, said first and second network identifiers corresponding to different networks;
means for receiving a data packet including a packet destination address on a link, the packet destination address being associated with a destination node, the destination node being capable of being a part of both the first ad-hoc wireless network and a second ad-hoc wireless network;
means for determining a network identifier corresponding to the link on which the data packet was received; and
means for forwarding the received data packet through one of a plurality of paths to the packet destination address based on at least the packet destination address, the determined network identifier, and a network affiliation included in the set of routing information, wherein the plurality of paths comprises a first path associated with the first ad-hoc wireless network and a second path associated with the second ad-hoc wireless network.

12. The first node of claim 11, further comprising:
means for making a decision whether or not to establish said first link based on said received information.

13. The first node of claim 11, wherein said set of routing information includes at least two entries corresponding to said packet destination address, each entry of said at least two entries being associated with a different network identifier.

14. A computer program product for use in a first node, the computer program product comprising:
a non-transitory computer readable medium comprising:
code for causing at least one computer to receive information from a second node, said information indicating a first network affiliation of a first ad-hoc wireless network for a first link between the first node and the second node;
code for causing said at least one computer to update a set of routing information to include a first forwarding table entry corresponding to the first link, said first forwarding table entry being associated with a first network identifier corresponding to said first indicated network affiliation;
code for causing said at least one computer to receive additional information from a third node, said additional information indicating a second network affiliation of a second ad-hoc wireless network for a second link between the first node and the third node;
code for causing said at least one computer to update said set of routing information to include a second forwarding table entry corresponding to the second link, said second forwarding table entry being associated with a second network identifier corresponding to said second indicated network affiliation, said first and second network identifiers corresponding to different networks;
code for causing said at least one computer to receive a data packet including a packet destination address on a link, the packet destination address being associated with a destination node, the destination node being capable of being a part of both the first ad-hoc wireless network and a second ad-hoc wireless network;
code for causing said at least one computer to determine a network identifier corresponding to the link on which the data packet was received; and
code for causing said at least one computer to forward the received data packet through one of a plurality of paths to the packet destination address based on at least the packet destination address, the determined network identifier, and a network affiliation included in the set of routing information, wherein the plurality of paths comprises a first path associated with the first ad-hoc wireless network and a second path associated with the second ad-hoc wireless network.

15. A method of operating a first node, the method comprising:
receiving information from a second node, said information indicating a first network affiliation of a first network for a first link between the first node and the second node;
updating a set of routing information to include a first forwarding table entry corresponding to the first link, said first forwarding table entry being associated with a first network identifier corresponding to said first indicated network affiliation;
receiving additional information from a third node, said additional information indicating a second network affiliation of a second ad-hoc wireless network for a second link between the first node and the third node;
updating said set of routing information to include a second forwarding table entry corresponding to the second link, said second forwarding table entry being associated with a second network identifier corresponding to said second indicated network affiliation, said first and second network identifiers corresponding to different networks;
receiving a data packet including a packet destination address on a link, the packet destination address being associated with a destination node, the destination node being capable of being a part of both the first network and a second network;
determining a network identifier corresponding to the link on which the data packet was received; and
forwarding the received data packet through a first path associated with the first network or a second path associated with the second network to the packet destination address based on at least the packet destination address, the determined network identifier, and a network affiliation included in the set of routing information, wherein the forwarding the received data packet through the first path or the second path comprises:

forwarding the received data packet through the second node associated with the first network to the packet destination address when the network affiliation of the link on which the data packet is received is associated with the first network; and forwarding the received data packet through a third node associated with said second network to the packet destination address when the network affiliation of the link on which the data packet is received is associated with said second network.

\* \* \* \* \*